United States Patent Office 3,404,188
Patented Oct. 1, 1968

3,404,188
PROCESS FOR THE PREPARATION OF
POLYHYDRIC ALCOHOLS
Walter Reynolds Privette, La Grange, Ill., and James Eli
Knap, Charleston, W. Va., assignors to Union Carbide
Corporation, a corporation of New York
No Drawing. Filed Nov. 1, 1963, Ser. No. 320,916
11 Claims. (Cl. 260—617)

This invention relates to an improved process for the preparation of oxygen-containing organic compounds by the reaction of an olefinically unsaturated organic compound with hydrogen and carbon monoxide in the presence of a hydroformylation catalyst. In one aspect, this invention relates to an improved process for the production of polyhydric alcohols by the reaction of an olefinic compound containing at least two carbon to carbon double bonds with hydrogen and carbon monoxide in the presence of cobalt-containing hydroformylation catalysts followed by hydrogenation of the aldehyde to the alcohol. In a further aspect, this invention relates to an improved process for the production of glycols which are useful in the preparation of plasticizers, resins, polyurethane foam, lubricants, detergents and other oxygenated organic compounds.

According to the accepted prior art procedures, it has been customary to react an olefin, carbon monoxide and hydrogen together in a first stage in the presence of a cobalt-containing catalyst to produce a crude hydroformylation product consisting of a liquid phase and a gaseous phase. The resulting crude liquid phase comprises aldehydes and alcohols containing one more carbon atom than the starting olefin, as well as a variety of byproducts, such as those formed from condensation, aldolization, acetalization and esterification of the products. Additionally, the gaseous phase comprises unreacted starting materials and volatile cobalt catalyst. In a second step, gaseous and liquid products are separated and the latter, comprising largely aldehydes, alcohols and dissolved metal catalyst, is treated in a catalyst removal zone for removal of the soluble metal compounds. The off-gases which also contain volatile cobalt compounds are then either vented to the atmosphere, burned as fuel, or recycled to the first stage of the process. Finally, in the third step, the catalyst-free liquid product is hydrogenated to the corresponding alcohol or oxidized to the corresponding carboxylic acid.

In those instances wherein the starting olefin contains two or more nonconjugated double bonds, the possibility exists for producing polyhydric alcohols, e.g., glycols, and the like. When carbon monoxide and hydrogen are reacted with hydrocarbons containing two double bonds, the reaction may proceed in several ways. For instance, carbon monoxide and hydrogen may add to one of the double bonds while hydrogen alone adds to the other double bond to produce a saturated aldehyde. Subsequent hydrogenation of the decobalted product will give a monohydric alcohol. However, if carbon monoxide and hydrogen both add to each of the double bonds, a dialdehyde is produced. Hydrogenation of the product provides either an aldehyde-alcohol or a dihydric alcohol.

Although the prior art teaches numerous methods for the hydroformylation of hydrocarbons containing one double bond, it is largely silent on a successful solution to the formation of undesired byproducts, particularly those which characterize the hydroformylation of multi-unsaturated hydrocarbons. Residue formation or the formation of saturated monoaldehydes rather than di-aldehydes is a long standing problem in the hydroformylation of multiunsaturated hydrocarbons.

Heretofore, the difficulties with the prior art processes arose from three main sources. First, the high viscosity of the polyhydric alcohol products. Secondly, the multiplicity of products obtainable in the hydroformylation of multiunsaturated hydrocarbons, and lastly the solubility differences among reactants, intermediates and products. Although techniques are known for minimizing some of these difficulties, no satisfactory process has been devised which affords a solution to all three.

For example, diluting the hydrocarbon to be hydroformylated is a classic method for controlling by-products formation and facilitating material transfers of viscous substances. Diluents described in the literature, however, are encumbered with one or more failings. Ethanol, for example, dissolves reactants, intermediates, and by-products but leads to the formation of undesired monohydric alcohols preferentially over di- and polyhydric alcohols. Hexane, on the other hand, produces high ratios of polyhydric to monohydric alcohols but does not dissolve hydroformylation products. Benzene produces the desired glycol/alcohol ratios and dissolves organic components during the hydroformylation step, but during a subsequent hydrogenation (to reduce content of sensitive aldehydes) benzene itself reacts with hydrogen to form cyclohexane which is no longer a solvent for the product diols.

Accordingly, one or more of the following objects will be achieved by the practice of the instant invention. It is an object of the present invention to provide an improved process for the production of aldehydes and alcohols. Another object is to provide an improved process for the preparation of polyhydric alcohols which are useful in the production of a variety of compositions. A further object of this invention is to provide an improved hydroformylation process employing polyolefins wherein the formation of saturated monohydric alcohols is minimized. Another object is to provide a solvent which dissolves reactants, intermediates, and products with equal facility and hence maintains homogeneity in the organic phase during both hydroformylation and hydrogenation. A still further object of this invention is to provide a hydroformylation solvent which is inert to subsequent hydrogenation procedures. These and other objects will readily become apparent to those skilled in the art in the light of the teachings herein set forth.

In accordance with the process of the present invention it has been found that during the hydroformylation and subsequent hydrogenation of olefinic compounds containing at least two non-conjugated double bonds, the ratio of polyhydric alcohols to monohydric alcohols can be greatly increased if the reactions are conducted in the presence of certain glycol ethers, as hereinafter defined. By conducting the process in this manner a surprisingly high ratio of polyhydric alcohol to monohydric alcohol is obtained. Additionally, the ethers do not undergo chemical change at any step in the reaction and thus provides for the use of a single solvent during the entire process. Ratios of polyhydric alcohol to monohydric alcohol of the order of 8:1 have been obtained by the process of the instant invention in contrast to ratios of only 0.1:1 when a different solvent, such as ethanol, is employed.

Although carbon monoxide and hydrogen can be caused to react with multiunsaturated hydrocarbons without the use of diluents, several advantages may be achieved by introducing the hydrocarbon to the reaction zone as a solution in a solvent which will maintain homogeneity at desired points in the process. The greatest advantage of using a diluent arises from the highly viscous character of many of the product diols. For example, dimethyloltetrahydro-4,7-methanoindene, the dihydroformylation product of dicyclopentadiene, has a viscosity of 44,670 centipoises at 40° C. When the viscosity of the product is thus reduced by a solvent, pumps run more easily, pressure drops along transfer lines are much less, the necessity for heating lines is obviated, and cleanup problems are simpler.

Polyglycol ethers present may advantages over other diluents used heretofore. Nonpolar hydrocarbon solvents produce a relatively high ratio of glycol/alcohol in the reaction product, but at inopportune stages in the process a heterogeneous reaction product occurs. Aliphatic hydrocarbon solvents cause the separation of hydroformylation products when the unsaturated hydrocarbon to be dihydroformylated adds the second molecule of carbon monoxide. Aromatic hydrocarbons dissolve dihydroformylation products of multi-unsaturated hydrocarbons satisfactorily but produce a heterogeneous organic phase during the subsequent hydrogenation step for reducing aldehyde content. For example, dicyclopentadiene in a reaction medium of benzene produces a homogeneous solution when carbon monoxide and hydrogen add to create the $C_{12}$ diol, dimethyloltetrahydro-4,7-methanoindene. The $C_{12}$ dialdehyde, which is produced as a precursor to the $C_{12}$ diol, is heat sensitive and must be hydrogenated prior to a refining distillation which necessarily subjects the mixture to high temperatures. When this dialdehyde is hydrogenated, the benzene hydroformylation medium also reacts with hydrogen to form cyclohexane, an alicyclic hydrocarbon which is not a good solvent for the $C_{12}$ diol. A heterogeneous mixture, therefore, is obtained from the hydrogenator. If the products separate from solvents into heterogeneous mixtures, the advantages of the solvent are negated, and difficulties inherent in viscous substances arise as though no solvent were present. The importance of homogeneity in the organic phase should not be confused with heterogeneity encompassing both the organic and inorganic constituents. A heterogeneous decobalting mixture, in which the top layer contains a homogeneous solution of organic components, affords a simple means for removing inorganic cobalt salts, which are contained in the lower layer.

The problem of a heterogeneous reaction mixture is completely eliminated by the use of glycol ethers as hydroformylation media. Further, polyglycol ethers favor the production of dihydroformylation products over monohydroformylation products. This in marked contrast to the results obtained when ethanol, dioxane, and other polar solvents were used in the prior art. Glycol ethers permit the use of much simpler equipment because the viscosity of the product glycols is reduced, and the same solvent is used for both hydrogenation and hydroformylation. Further, using polyglycol ethers as a hydroformylation medium minimizes residues formation caused by polymerization of the olefinic reactant and condensation of the highly reactive dialdehyde products. Most important, glycol ethers surprisingly produce glycols in preference to the less-commercially desirable monohydric alcohols.

In general, the glycol ethers which are suitable for use as solvents in the process of the present invention can be conveniently represented by the formula:

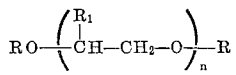

wherein $R_1$ represent hydrogen or methyl and need not be the same throughout the molecule; R represents hydrogen or alkyl of from 1 to 10 carbon atoms; and $n$ is a whole positive integer of from 1 to 4, with the proviso that both R's are not hydrogen.

Illustrative glycol ethers include, among others, the beta-alkoxyethanols, e.g., beta-methoxyethanol, beta-ethoxyethanol, beta-butoxyethanol, beta-hexoxyethanol, and the like; the beta-alkoxypropanols, e.g., beta-methoxypropanol, beta-ethoxypropanol, beta-butoxypropanol, and the like; the diethylene glycol dialkyl ethers, e.g., diethylene glycol diethyl ether, and the like; the triethylene glycol dialkyl ethers, e.g., triethylene glycol dimethyl ether, triethylene glycol dimethyl ether, triethylene glycol diethyl ether, and the like; the tetraethylene glycol dialkyl ethers, e.g., tetraethylene glycol dimethyl ether, tetraethylene glycol diethyl ether, and the like; the dipropylene glycol dialkyl ethers, e.g., dipropylene glycol diethyl ether, dipropylene glycol dimethyl ether, and the like; the tripropylene glycol dialkyl ethers, e.g., tripropylene glycol diethyl ether, and the like; the diethylene glycol monoalkyl ethers, e.g., diethylene glycol monoethyl ether, diethylene glycol monomethyl ether, and the like; the triethylene glycol monoalkyl ethers, e.g., triethylene glycol monomethyl ether, triethylene glycol monoethyl ether, and the like; the dipropylene glycol monoalkyl ethers, e.g., dipropylene glycol monomethyl ether, dipropylene glycol monoethyl ether, and the like; the tripropylene glycol monoalkyl ethers, e.g., tripropylene glycol monoethyl ether, and the like. Of the aforementioned compositions, the most preferred are beta-ethoxyethanol, beta-butoxyethanol, beta-hexoxyethanol and diethylene glycol diethyl ether.

In practice, the selection of the glycol ether solvent will be influenced by the chemical and physical properties of the particular reactants and products. By employing glycol ethers with suitable boiling points virtually any system can be derived in which the recovery of the products can be effected in the most feasible and economical manner.

The ratio of solvent to olefinic starting material is preferably in the range of from about 1:1 to about 3:1, and higher. Ratios of solvent to olefin above and below this range can also be employed but are less preferred. Inasmuch as increased solvent reduces productivity by lowering the concentration of olefinic reactant, the upper limit is controlled largely by economic considerations.

The olefins suitable for use as sarting materials in the process of the present invention can be any cyclic or long or short open chained olefinic compound containing at least two non-conjugated carbon to carbon double bonds. Suitable olefins include not only hydrocarbons, but other organic compounds, such as, for example, unsaturated alcohols, acids, esters and the like. Cyclic olefins and straight and branched-chain olefins containing from 5 to 15 carbon atoms, and higher, such as dicyclopentadiene, 4-vinyl-1-cyclohexene, myrcene, cyclooctadiene dipentene, ocimene, 1,4-pentadiene, and olefinic fractions from the hydrocarbon synthesis process, thermal or catalytic cracking operations and other sources of hydrocarbon fractions containing such olefins, can be employed as starting materials depending on the nature of the desired final product.

While the synthesis gas mixture fed to the first stage of the hydroformylation reactor may be any desired ratio of hydrogen to carbon monoxide, it is preferred to employ a ratio within the limits of 1.0 to 2.0 volumes of hydrogen per volume of carbon monoxide. The ratio of carbon monoxide to olefin should be at least 1:1 or higher on a molar basis, preferably about 1.5:1.0. While the actual conditions for reacting olefins with the synthesis gases will undoubtedly vary in accordance with the nature of the olefin feed, it is desirable to conduct the reaction at a temperature within the range of from about 100° C. to about 250° C., more preferably from about 140° C. to about 190° C., under super-atmospheric pressures in the range of from about 1000 to about 10,000 more preferably from about 3,000 to about 6,000 pounds per square inch guage.

The process of the present invention is applicable regardless of the nature or manner in which the cobalt catalyst is employed. The catalyst can be employed in either (a) the insoluble form such as cobalt metal, cobalt oxide, cobalt carbonate, or as cobalt salts, such as cobalt acetate, which are introduced in slurry form; or (b) as the soluble cobalt compounds such as cobalt carbonyl or hydrocarbonyl, cobalt naphthenate, stearate, or 2-ethylhexanoate and the like, introduced in a solution of a hydrocarbon or oxygen-containing organic solvent such as alcohols, esters, ethers, and the like; or (c) aqueous solution of cobalt salts, such as cobalt formate, cobalt acetate, and the like.

However, the optimum results are obtained when the catalyst is employed in the form of an oil insoluble cobalt salt of a lower aliphatic monocarboxylic acid such as cobalt acetate, formate or propionate dissolved or slurried in a lower aliphatic alcohol such as methanol, ethanol, propanol and butanol. The utilization of a water-soluble-oil-insoluble cobalt salt of a lower aliphatic carboxylic acid represents a cheaper and more readily available form for the source of the active catalyst.

The hydroformylation reaction is generally carried out in conventional pressure vessels, such as tanks, towers, autoclaves, or tubular reactors, particularly designed to maintain necessary pressures and temperatures of the reaction. In the hydroformylation reaction of higher molecular weight olefins such as the octenes, nonenes, dodecenes, and the like compounds, the chemical reaction rate is quite slow and, in many instances, is the controlling factor of the process. In such case the reaction rate will determine, in part, the design of equipment and the manner of operation of the process.

The following examples are illustrative:

Example 1

A 3-liter, high-pressure autoclave was charged with 400 milliliters of β-ethoxyethanol, 8 grams of dicobalt octacarbonyl, and 0.2 gram of hydroquinone. After being purged three times with a 50–50 mixture of carbon monoxide-hydrogen, the autoclave was closed and heated to 150° C. On attainment of the reaction temperaure, the autoclave was then pressured with 50–50 carbon monoxide-hydrogen to 4500 pounds per square inch guage. A solution containing 200 milliliters each of dicyclopentadiene and β-ethoxyethanol was then injected into the autoclave over a 2-hour period. During the reaction, pressure on the autoclave was maintained at 4500 pounds per square inch guage.

When all of the dicyclopentadiene solution in β-ethoxyethanol had been pumped into the autoclave, reaction conditions were maintained until no further gas absorption was observed. The temperature was then raised to 180° C. and the pressure to 6000 pounds per square inch guage. These more strenuous reaction conditions were maintained until no further evidence of gas absorption was seen, generally less than 30 minutes.

The hydroformylation mixture was charged to a 2-liter kettle along with 450 milliliters 5 percent aqueous sulfuric acid. The mixture was refluxed at atmospheric pressure until the distillate was colorless. (During initial stages of this decobalting operation, the organic layer of the distillate was dark brown in color, indicating presence of undecomposed dicobalt octacarbonyl.) After approximately one hour refluxing the distillate color disappeared, and refluxing was continued an additional hour.

When the decobalting mixture had cooled to ambient temperatures, 50 grams of precipitated calcium carbonate were added to neutralize the sulfuric acid. Following the neutralization, the decobalting mixture was filtered free of solids and combined with 14 grams of Raney nickel (moist with water).

The decobalted mixture containing the Raney nickel was charged to a pressure vessel and reacted with hydrogen at a temperature of 180° C. and a pressure of 1000 pounds per square inch guage until absorption ceased. Product from the hydrogenation was filtered free of Raney nickel and charged to a still, which consisted of a two-liter kettle equipped with a 25-millimeter x 250-millimeter, electrically heated column which had been filled with ¼ inch x ¼ inch protruded saddles. The column was fitted with a total-condensing, partial-take-off head, double-ball receiver, and a vacuum system.

β-Ethoxyethanol and water were separated from the remaining constituents of the hydrogenator product by distilling to a head temperature of 75° C. at 2 millimeters' pressure of mercury absolute pressure. A second fraction was then recovered, which boiled up to 140° C. at 1 millimeter pressure, weighed 21 grams, and represented 8 percent yield $C_{11}$ alcohol. The following fraction contained all materials volatile at 1 millimeter pressure of mercury absolute pressure to a kettle temperature of 300° C. The maximum head temperature attained was 174° C. The fraction weighed 153 grams and represented a yield of 52 percent $C_{12}$ diol. Thus, based on fraction weights, a ratio of 6.5/1 glycol/alcohol was attained. The weight of distillation residue was 145 grams.

Examples 2–10

In a manner similar to that described in the previous example, various other glycol ethers were employed as the solvent for the hydroformylation and hydrogenation of dicyclopentadiene. The particular solvent employed, together with other pertinent data are set forth in Table I below. For comparison purposes, ethanol was also employed as a hydroformylation solvent under the same conditions as set forth in Example 1. As is evident from the data obtained, the ratio of glycol to alcohol is considerably enhanced when the hydroformylation and hydrogenation is conducted in the glycol ether solvent.

TABLE I.—HYDROFORMYLATION OF MULTIUNSATURATED HYDROCARBONS IN GLYCOL ETHER REACTION MEDIA

| Example Number | Hydroformylation solvent | Decobalting technique [1] | Yields, Percent (based on weights of distillation fractions) | | Mol Ratio Glycol/Alcohol |
|---|---|---|---|---|---|
| | | | Alcohol | Glycol | |
| 2 | β-Butoxyethanol | Standard | 7 | 47 | 7.6 |
| 3 | β-Methoxyethanol | do | 30 | 41 | 1.4 |
| 4 | Ethoxy triethylene glycol | do | 24 | 53 | 2.2 |
| 5 | β-Hexyloxyethanol | do | 6 | 40 | 6.7 |
| 6 | β-Ethoxypropanol | do | 8 | 67 | 8.4 |
| 7 | Diethylene glycol diethyl ether | Improved | 6 | 43 | 7.2 |
| 8 | α-Butoxyethanol | do | 6 | 53 | 8.8 |
| 9 | α-Hexyloxyethanol | do | 6 | 48 | 8.0 |
| 10 | Ethanol | Standard | 32 | 3 | 0.1 |

[1] The standard decobalting technique embodied neutralizing with $CaCO_3$ and filtering without separating layers. The improved technique incorprated separating layers and neutralizing the organic layer prior to filtering and hydrogenating.

Example 11

In a technique identical to that described for Example 1, β-ethoxyethanol was used as a hydroformylation medium for the reaction of 4-vinyl-1-cyclohexene with carbon monoxide and hydrogen in the presence of dicobalt octacarbonyl catalyst, hydroquinone inhibitor, at 150° C. and 180° C., and 4500 pounds per square inch guage and 6000 pounds per square inch guage pressure. Decobalting and hydrogenation procedures were identical to those described for Example 1. In the refining distillation, the monoalcohol was removed as a fraction boiling from 64–116° C. at 1 millimeter pressure of mercury absolute pressure. The glycol fraction was the remainder of the material volatile at a kettle temperature of 300° C. and 1 millimeter pressure of mercury pressure. The yield of monoalcohol thus obtained was 18 percent, and the yield of glycol was 40 percent; the ratio of glycol to alcohol produced was 2.2/1.

Example 12

Diethylene glycol diethyl ether was used as the hydroformylation medium for the reaction of carbon monoxide and hydrogen with myrcene.

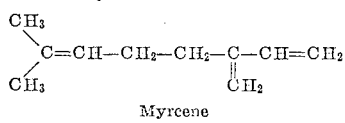

Myrcene

Procedures were the same as those described in Example 1. Monoalcohol was removed as a fraction boiling at 42–122° C. temperature and 1 millimeter pressure of mercury. The yield of monoalcohol thus produced was 26 percent, and the yield of glycol was 27 percent; the ratio of glycol/alcohol produced was 1.0/1.

Although the invention has been illustrated by the preceding examples it is not to be construed as limited to the materials employed therein, but rather, the invention encompasses the generic area as hereinbefore disclosed. Various modifications and embodiments of this invention can be made without departing from the spirit and scope thereof.

What is claimed is:

1. In a hydroformylation process wherein olefinic compounds having 5 to about 15 carbon atoms and containing at least two conjugated double bonds per molecule are contacted in an initial reaction zone with the carbon monoxide and hydrogen in the presence of a cobalt-containing hydroformylation catalyst at a temperature of from about 100° C. to about 250° C., thereby producing a crude hydroformylation product comprising aldehydes, which is subsequently decobalted, and the aldehydes hydrogenated to alcohols, the improvement in said process comprising conducting said hydroformylation and hydrogenation in the presence of a glycol ether solvent wherein the ratio of the solvent to the olefinic compounds is from about 1 to 1 to about 3 to 1, said glycol ether solvent having the formula:

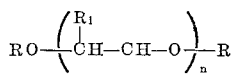

wherein $R_1$ represents a member selected from the group consisting of hydrogen and methyl; R represents a member selected from the group consisting of hydrogen and alkyl of from 1 to 10 carbon atoms with the proviso that both R's are not hydrogen; and $n$ represents a whole positive integer of from 1 to 4; whereby the ratio of polyhydric alcohols to monohydric alcohols formed by said process is maximized.

2. In a hydroformylation process wherein olefinic compounds having from 5 to about 15 carbon atoms and containing at least two conjugated double bonds per molecule are contacted in an initial reaction zone with carbon monoxide and hydrogen in the presence of a cobalt-containing hydroformylation catalyst at a temperature of from about 100° C. to about 250° C. to thereby produce a crude hydroformylation product comprising aldehydes, which is subsequently decobalted, and the aldehydes hydrogenated to alcohols, the improvement in said process comprising conducting said hydroformylation and hydrogenation in the presence of beta-alkoxyethanol solvent in which the alkoxy group contains from 1 to about 10 carbon atoms, using a solvent to olefinic compound ratio of from about 1 to 1 to about 3 to 1, whereby the ratio of polyhydric alcohols to monohydric alcohols formed by said process is maximized.

3. In a hydroformylation process wherein dicyclopentadiene is contacted in an initial reaction zone with carbon monoxide and hydrogen in the presence of a cobalt-containing hydroformylation catalyst at a temperature of from about 100° C. to about 250° C. to thereby produce a crude hydroformylation product comprising aldehydes, which is subsequently decobalted, and the aldehydes hydrogenated to alcohol, the improvement in said process comprising conducting said hydroformylation and hydrogenation in the presence of beta-ethoxyethanol as the solvent using a solvent to dicyclopentadiene ratio of from about 1 to 1 to about 3 to 1, whereby the ratio of glycol to monohydric alcohol is maximized.

4. In a hydroformylation process wherein olefinic compounds having 5 to about 15 carbon atoms and containing at least two nonconjugated double bonds per molecule are contacted in an initial reaction zone with carbon monoxide and hydrogen in the presence of a cobalt-containing hydroformylation catalyst at a temperature of from about 100° C. to about 250° C. to thereby produce a crude hydroformylation product comprising aldehydes, which is subsequently decobalted, and the aldehydes hydrogenated to alcohols, the improvement in said process comprising conducting said hydroformylation and hydrogenation in the presence of a gamma-alkoxypropanol whereby the ratio of polyhydric alcohols to monohydric alcohols formed by said process is maximized.

5. In a hydroformylation process wherein olefinic compounds having 5 to about 15 carbon atoms and containing at least two nonconjugated double bonds per molecule are contacted in an initial reaction zone with carbon monoxide and hydrogen in the presence of a cobalt-containing hydroformylation catalyst at a temperature of from about 100° C. to about 250° C. to thereby produce a crude hydroformylation product comprising aldehydes, which is subsequently decobalted, and the aldehydes hydrogenated to alcohols, the improvement in a said process comprising conducting said hydroformylation and hydrogenation in the presence of beta-methoxyethanol whereby the ratio of polyhydric alcohols to monohydric alcohols formed by said process is maximized.

6. In a hydroformylation process wherein olefinic compounds having 5 to about 15 carbon atoms and containing at least two nonconjugated double bonds per molecule are contacted in an initial reaction zone with carbon monoxide and hydrogen in the presence of a cobalt-containing hydroformylation catalyst at a temperature of from about 100 C. to about 250° C. to thereby produce a crude hydroformylation product comprising aldehydes, which is subsequently decobalted, and the aldehydes hydrogenated to alcohols, the improvement in said process comprising conducting said hydroformylation and hydrogenation in the presence of beta-ethoxyethanol whereby the ratio of polyhydric alcohols to monohydric alcohols formed by said process is maximized.

7. In a hydroformylation process wherein olefinic compounds having 5 to about 15 carbon atoms and containing at least two nonconjugated double bonds per molecule are contacted in an initial reaction zone with carbon monoxide and hydrogen in the presence of a cobalt-containing hydroformylation catalyst at a temperature of from about 100° C. to about 250° C. to thereby produce a crude hydroformylation product comprising aldehydes, which is subsequently decobalted, and the aldehydes hydrogenation to alcohols, the improvement in said process comprising conducting said hydroformylation and hydrogenation in the presence of beta-butoxyethanol wherein the ratio of polyhydric alcohols to monohydric alcohols formed by said process is maximized.

8. In a hydroformylation process wherein olefinic compounds having 5 to about 15 carbon atoms and containing at least two nonconjugated double bonds per molecule are contacted in an initial reaction zone with carbon monoxide and hydrogen in the presence of a cobalt-containing hydroformylation catalyst at a temperature of from about 100° C. to about 250° C. to thereby produce a crude hydroformylation product comprising aldehydes, which is subsequently decobalted, and the aldehydes hydrogenated to alcohols, the improvement in said process comprising conducting said hydroformylation and hydrogenation in the presence of ethoxytriethylene glycol wherein the ratio of polyhydric alcohols to monohydric alcohols formed by said process is maximized.

9. In a hydroformylation process wherein olefinic compounds having 5 to about 15 carbon atoms and containing at least two nonconjugated double bonds per molecule are contacted in an initial reaction zone with carbon monoxide and hydrogen in the presence of a cobalt-containing hydroformylation catalyst at a temperature of from about 100° C. to about 250° C. to thereby produce a crude hydroformylation product comprising aldehydes, which is subsequently decobalted, and the aldehydes hydrogenated to alcohols, the improvement in said process comprising conducting said hydroformylation and hydrogenation in the presence of diethylene glycohol diethyl ether wherein the ratio of polyhydric alcohols to monohydric alcohols formed by said process is maximized.

10. In a hydroformylation process wherein olefinic compounds having 5 to about about 15 carbon atoms and containing at least two nonconjugated double bonds per molecule are contacted in an initial reaction zone with carbon monoxide and hydrogen in the presence of a cobalt-containing hydroformylation catalyst at a temperature of from about 100° C. to about 250° C. to thereby produce a crude hydroformylation product comprising aldehydes, which is subsequently decobalted, and the aldehydes hydrogenated to alcohols, the improvement in said process comprising said hydroformylation and hydrogenation in the presence of beta-hexoxyethanol wherein the ratio of polyhydric alcohols to monohydric alcohols formed by said process is maximized.

11. In a hydroformylation process wherein olefinic compounds having 5 to about 15 carbon atoms and containing at least two nonconjugated double bonds per molecule are contacted in an initial reaction zone with carbon monoxide and hydrogen in the presence of a cobalt-containing hydroformylation catalyst at a temperature of from about 100° C. to about 250° C. to thereby produce a crude hydroformylation product comprising aldehydes, which is subsequently decobalted, and the aldehydes hydrogenated to alcohols, the improvement in said process comprising conducting said hydroformylation and hydrogenation in the presence of gamma-ethoxypropanol wherein the ratio of polyhydric alcohols to monohydric alcohols formed by said process is maximized.

References Cited

UNITED STATES PATENTS

| | | | |
|---|---|---|---|
| 2,691,047 | 10/1954 | Hagemeyer | 260—604 |
| 3,257,459 | 6/1961 | Swakon et al. | 260—617 |
| 2,850,536 | 9/1958 | Buchner et al. | 260—617 |
| 3,150,188 | 9/1964 | Eisenmann et al. | 260—617 |
| 2,841,614 | 7/1958 | Buchner et al. | 260—617 |

FOREIGN PATENTS 774,408   5/1957   Great Britain.

BERNARD HELFIN, *Primary Examiner.*

T. G. DILLAHUNTY, *Assistant Examiner.*